United States Patent [19]
Portman

[11] Patent Number: 5,738,392
[45] Date of Patent: Apr. 14, 1998

[54] LATCH FOR SECURING AN AIRCRAFT VIDEO DEVICE

[75] Inventor: John R. Portman, Anahiem, Calif.

[73] Assignees: Sony Corporation, Tokyo, Japan; Sony Transcom, Inc., Irvine, Calif.

[21] Appl. No.: 542,365

[22] Filed: Oct. 12, 1995

[51] Int. Cl.$^6$ .................................................. E05C 3/06
[52] U.S. Cl. .................. 292/201; 292/251.5; 292/230; 292/DIG. 56
[58] Field of Search .................. 292/201, 251.5, 292/DIG. 56, 341.16, 230, 194; 312/7.2, 248

[56] References Cited

U.S. PATENT DOCUMENTS

| | | | |
|---|---|---|---|
| 1,744,960 | 1/1930 | Garbell | 292/80 X |
| 2,081,055 | 5/1937 | Kiracofe | 292/201 |
| 2,660,765 | 12/1953 | Carlson | 292/DIG. 36 X |
| 4,981,313 | 1/1991 | Makamura | 292/DIG. 56 X |
| 5,096,271 | 3/1992 | Portman | 312/7.2 |
| 5,181,771 | 1/1993 | Robak et al. | 312/248 X |

FOREIGN PATENT DOCUMENTS

| | | | |
|---|---|---|---|
| 1803 | of 1905 | United Kingdom | 292/201 |
| 2123891 | 2/1984 | United Kingdom | 292/251.5 |

OTHER PUBLICATIONS

Solenoids, Cliftronics, Inc., Clifton Springs, New York, pp. 32-34 and p. 49.

*Primary Examiner*—Rodney M. Lindsey
*Attorney, Agent, or Firm*—Pasquale Musacchio; Jerry A. Miller

[57] ABSTRACT

A latch is disclosed for securing a television monitor for an aircraft video system in a horizontal position, wherein the monitor is rotatable between the horizontal position and a downward position suitable for passenger viewing. The latch includes a solenoid having a hinged element. The hinged element may be rotated to a closed position wherein the hinged element is in a vertical orientation. The hinged element may also be rotated to an open position wherein the hinged element is rotated away from the vertical orientation. Further, the hinged element includes a cutout having a reverse L-shaped configuration and a first mating surface. In addition, a notch is formed in a bezel for the monitor. The notch includes a second mating surface wherein when the hinged element is in the open position and the monitor is in the horizontal position, the second mating surface rests upon the first mating surface thereby securing the monitor in the horizontal position. Further, a noise reducing material is affixed to the hinged dement to reduce the amount of noise generated during operation of the solenoid.

25 Claims, 4 Drawing Sheets

LATCH FOR SECURING AN AIRCRAFT VIDEO DEVICE

FIELD OF THE INVENTION

This invention relates to aircraft video entertainment systems, and more particularly, to a latch for securing a monitor used in an aircraft video system in a horizontal position.

BACKGROUND OF THE INVENTION

Aircraft cabins frequently include a video system having television monitors for displaying motion pictures and other programming. In such systems, the monitors are each rotatably mounted to the ceiling of the cabin to enable rotation of the monitor. In use, the monitors are rotated downward from the ceiling of the cabin into a viewing position, thus enabling viewing of the monitor by the passengers. When viewing is completed, the monitors are then rotated back toward the ceiling into a horizontal, or stowed, position. A drive mechanism is associated with each monitor for rotating the monitor between the viewing and stowed positions. One such system is described in U.S. Pat. No. 5,096,271 entitled DRIVE ASSEMBLY, POWER OFF RETRACT which issued to John R. Portman and is assigned to Sony Transcom, Inc. In particular, this patent describes a display unit which is adapted to absorb collisions between a passenger and the monitor so as to reduce the likelihood of passenger injuries. Further, the monitor is adapted to retract if electrical power is lost in the cabin as required by Federal Aviation Administration (FAA) regulations. In addition, FAA regulations prohibit the deployment of a monitor if the drive mechanism is not functioning properly.

Latch mechanisms, also known as uplatches, are typically utilized to latch and thus removably secure the monitor in the stowed position. Referring to FIG. 1, a first uplatch mechanism 10 is shown. The first mechanism 10 includes a solenoid 12 having a plunger 14 which extends outward (as indicated by arrow) upon activation of the solenoid 12. The plunger 14 is then received by a hole 16 formed in a bezel 18 for a monitor 20, thus latching the monitor 20 in the stowed position. However, it has been found that full extension of the plunger 14 does not always occur due to variations in the operation of the solenoid 12. Consequently, the plunger 14 frequently does not engage the hole 16, resulting in inconsistent latching of the monitor 20. In addition, the hole 16 is visible to the passengers when the monitor 20 is in the viewing position, thus detracting from the aesthetic appeal of the monitor 20. Further, the first mechanism 10 has been found to consume excessive amounts of electrical power. Moreover, operation of the mechanism 10 results in slamming of the plunger 14, resulting in the generation of excessive noise.

Referring to FIGS. 2A and 2B, a second uplatch mechanism 22 is shown. The second mechanism 22 includes an uplatch wheel 24 and a pawl 26 having an extended portion 28. The pawl 26 is rotatably mounted to a frame 30 and is adapted to be rotated by a solenoid. The wheel 24 is affixed to a monitor and rotates together with the monitor. The wheel 24 includes an aperture 34 which mates with the extended portion 28 to latch the monitor 32. Upon activation of the solenoid, the pawl 26 rotates away from the wheel 24 such that the extended portion 28 is removed from the aperture 34. This unlatches the monitor, thus enabling the wheel 24 and thus the monitor to rotate. However, the second mechanism 22 is expensive due to the costs associated with fabrication of the wheel 24 and the pawl 26. Further, the second mechanism 22 has also been found to consume excessive amounts of electrical power. In still other uplatch mechanisms, complex linkages are utilized in conjunction with a solenoid. However, it has been found that the linkages are prone to failures, thus resulting in unreliable latching of the monitors.

Therefore, it is an object of the present invention to provide an uplatch device having substantially improved latching reliability. It is a further object to provide an uplatch device which decreases the amount of power that is consumed during latch operation. It is a still further object to provide an uplatch device which is relatively inexpensive to fabricate. Furthermore, it is an object of the present invention to provide an uplatch device which substantially decreases the amount of noise that is generated during operation.

SUMMARY OF THE INVENTION

The present invention is directed to a latch for securing a viewing element for an aircraft video system, such as a television monitor, in a horizontal position, wherein the monitor is rotatable between the horizontal position and a downward position suitable for passenger viewing. The latch includes a solenoid having a hinged element. The hinged element may be rotated to a closed position wherein the hinged element is in a vertical orientation. The hinged element may also be rotated to an open position wherein the hinged element is rotated away from the vertical orientation. Further, the hinged element includes a cutout having a first mating surface.

In addition, a notch is formed in the monitor. The notch includes a second mating surface wherein when the hinged element is in the open position and the monitor is in the horizontal position, the second mating surface rests upon the first mating surface thereby securing the monitor in the horizontal position.

DETAILED DESCRIPTION OF THE INVENTION

Figure 1:
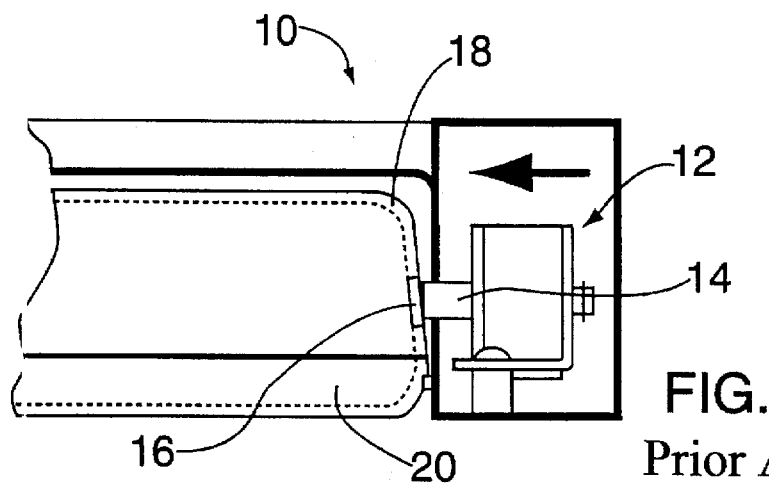
FIG. 1 is a view of one type of uplatch mechanism.
Figure 2A:
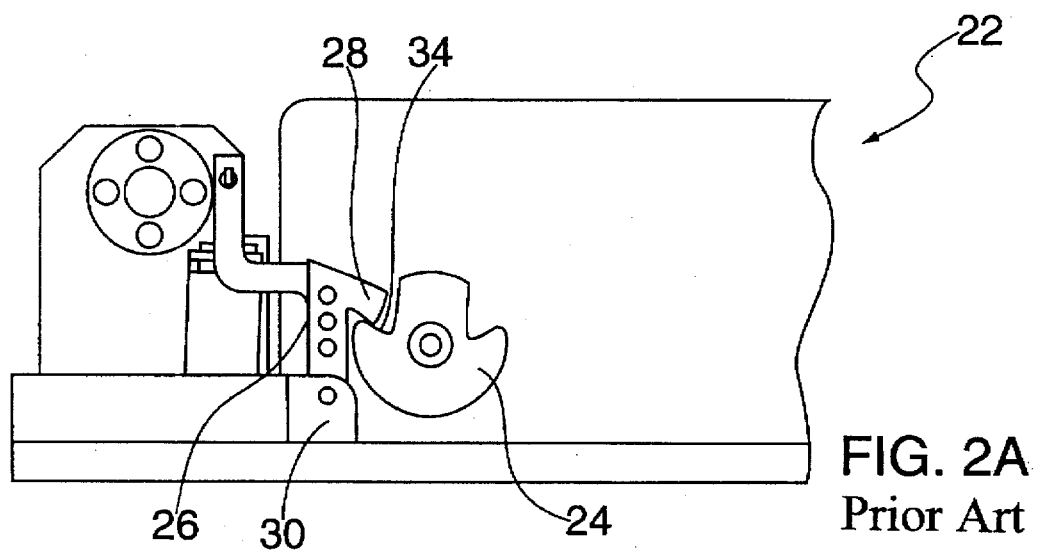
FIGS. 2A and 2B are views of a second type of uplatch mechanism.
Figure 2B:
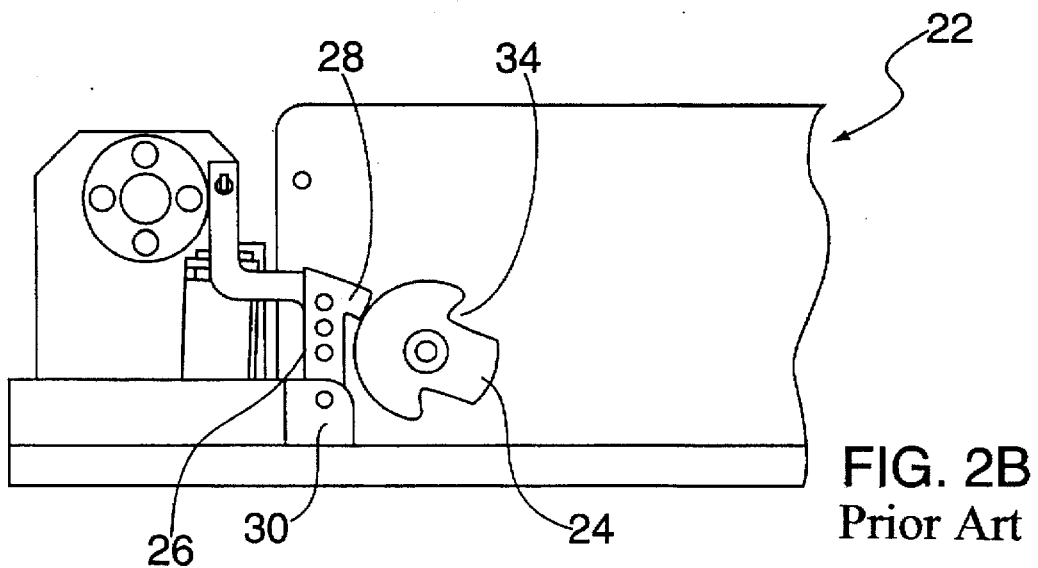

The present invention will now be described by referring to FIGS. 3–6, wherein like elements are designated by like reference numerals.

Figure 3:
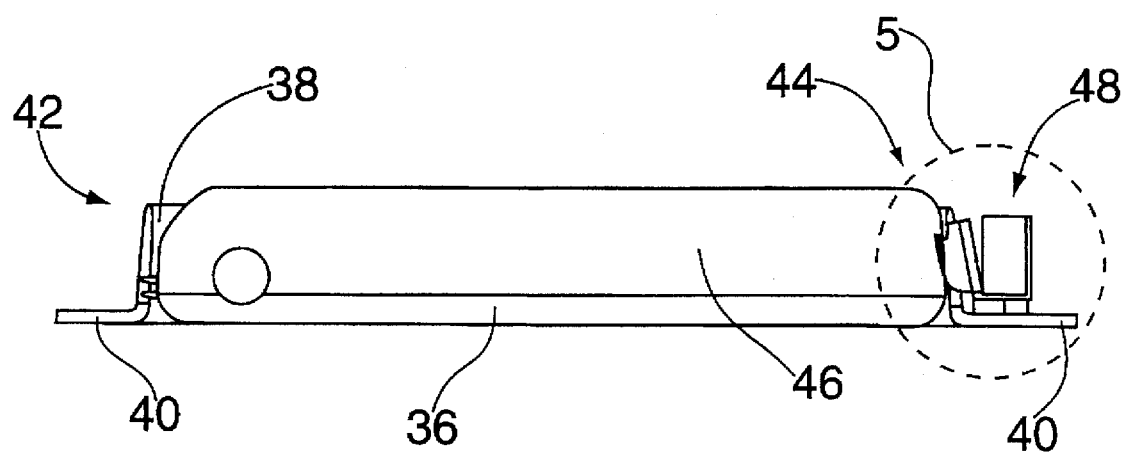
FIG. 3 shows a viewing element which is latched in a horizontal position by a latch device in accordance with the present invention.
Figure 4:
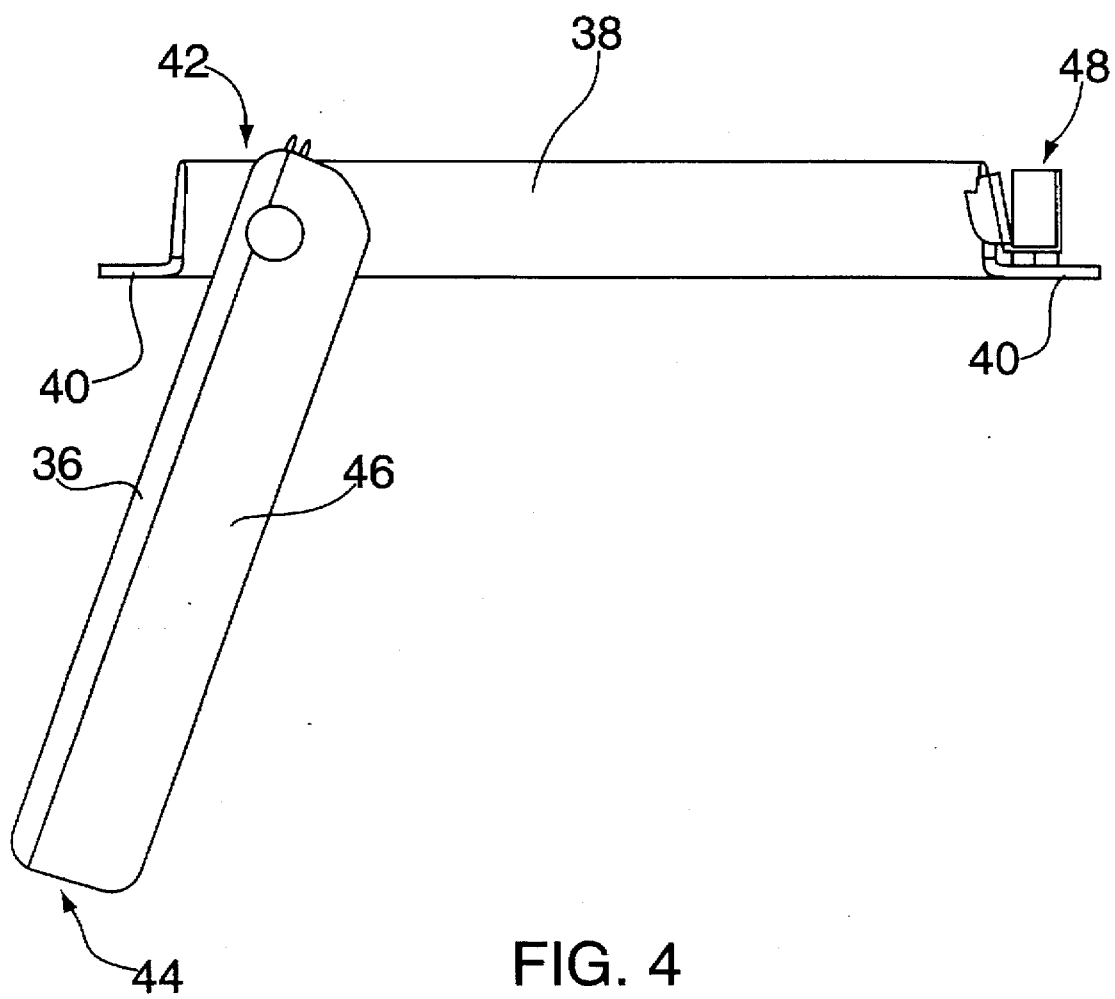
FIG. 4 shows the viewing element in a viewing position.

Referring to FIGS. 3 and 4, a viewing element 36 for an aircraft video system is shown positioned within a recess 38 located in an aircraft cabin ceiling 40. In accordance with the present invention, the viewing element 36 may be any type of display such as a television monitor or other device having a cathode ray tube or a liquid crystal, plasma, active or passive matrix display. The viewing element 36 includes first 42 and second 44 ends and a bezel 46 which extends between the first 42 and second 44 ends. The first end 42 is rotatably mounted to the ceiling 40, thus enabling rotation of the viewing element 36 between a retracted position and a viewing position. Referring to FIG. 3, the viewing element 36 is shown in the retracted position. In this position, the viewing element 36 is oriented substantially horizontally within the recess 38. Referring to FIG. 4, the viewing element 36 is shown in the viewing position. In this position, the viewing element 36 extends downward from the ceiling 40 in an orientation suitable for viewing by the passengers. A drive mechanism (not shown) may be utilized to rotate the viewing element 36 between the retracted and viewing positions. Further, the drive mechanism is adapted to hold the viewing element 36 in the retracted position. FAA regulations prohibit downward rotation of the viewing device 36 if a failure occurs wherein the drive mechanism is unable to hold the viewing element 36 in the retracted position. In accordance with the present invention, an uplatch device 48 is affixed to the ceiling 40 adjacent the second end 44 and the bezel 46. The device 48 serves to latch the second end 44, thus inhibiting downward rotation of the viewing element 36.

Figure 5:
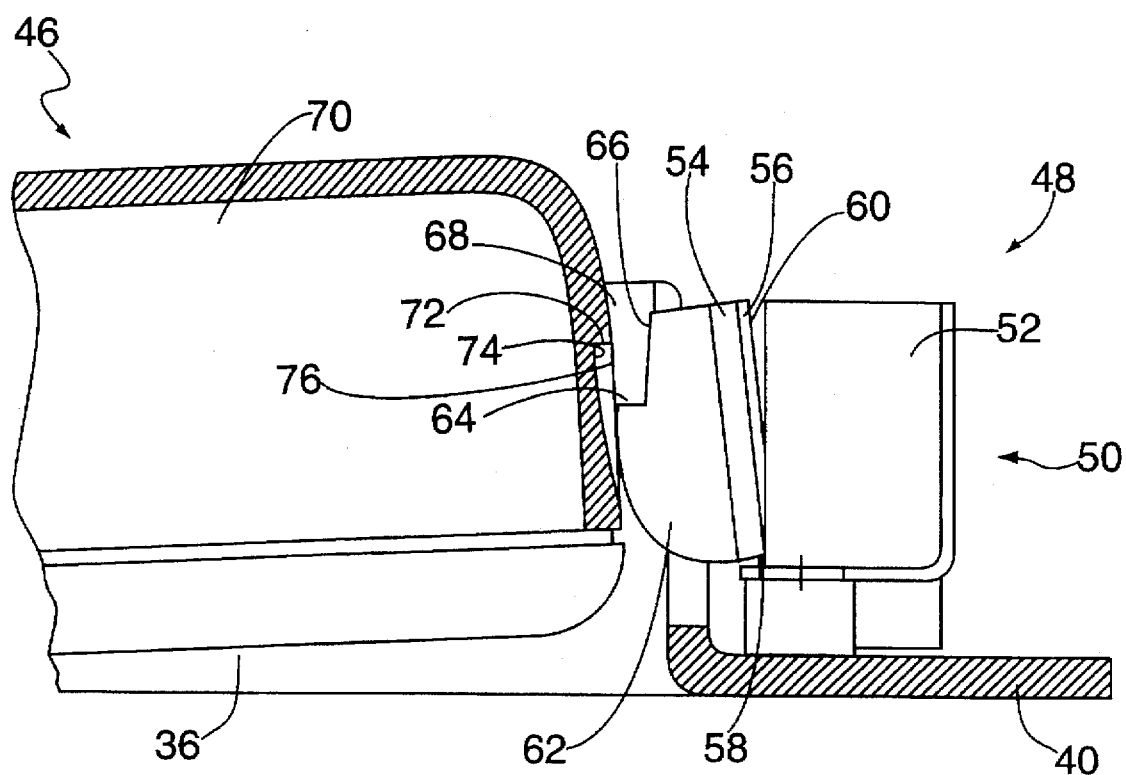
FIG. 5 is an enlarged partial cross sectional view of balloon section 5 of FIG. 3 and shows the latch device in an open (de-energized) position and the viewing element in a retracted position.

Referring to FIG. 5, an enlarged partial cross sectional view of the device 48 and bezel 46 depicted within balloon section 5 of FIG. 3 is shown. The device 48 includes a solenoid 50 having a housing 52 which is affixed to the ceiling 40. The solenoid 50 further includes an armature 54 having an armature face 56. The armature 54 is rotatably connected to the housing 52 by a hinge 58 to enable rotation of the armature 54 between an open position and a closed position. In FIG. 5, the armature 54 is shown in the open position. In the open position, the armature 54 is rotated counterclockwise away from the vertical orientation and thus the housing 52. As will be described, placement of the armature 54 in the open position enables latching of the viewing element 36. The solenoid 50 includes a spring (not shown) which is biased to consistently urge the nature 54 toward the open position, thus substantially improving latching reliability.

A plunger element 62 is affixed to the armature 54 and thus moves in unison with armature 54. As such, a substantial amount of the weight of the plunger element 62 is carried by the hinge 58, thus reducing the amount of electrical power consumed in operating the solenoid 50. The plunger element 62 includes a cutout having a horizontal cutout portion 64 and a vertical cutout portion 66 to form a reverse L-shaped cutout 68. The bezel 46 includes a wall 70 having a horizontal recess portion 72 and a tapered recess portion 74 to form a notch 76 adapted to mate with the cutout 68. The horizontal recess portion 72 and tapered recess 74 portions each extend only partially into the wall 70. As such, the notch 76 is not substantially noticeable from the viewing position and thus does not substantially detract from the aesthetic appeal of the viewing element 36.

Figure 6:
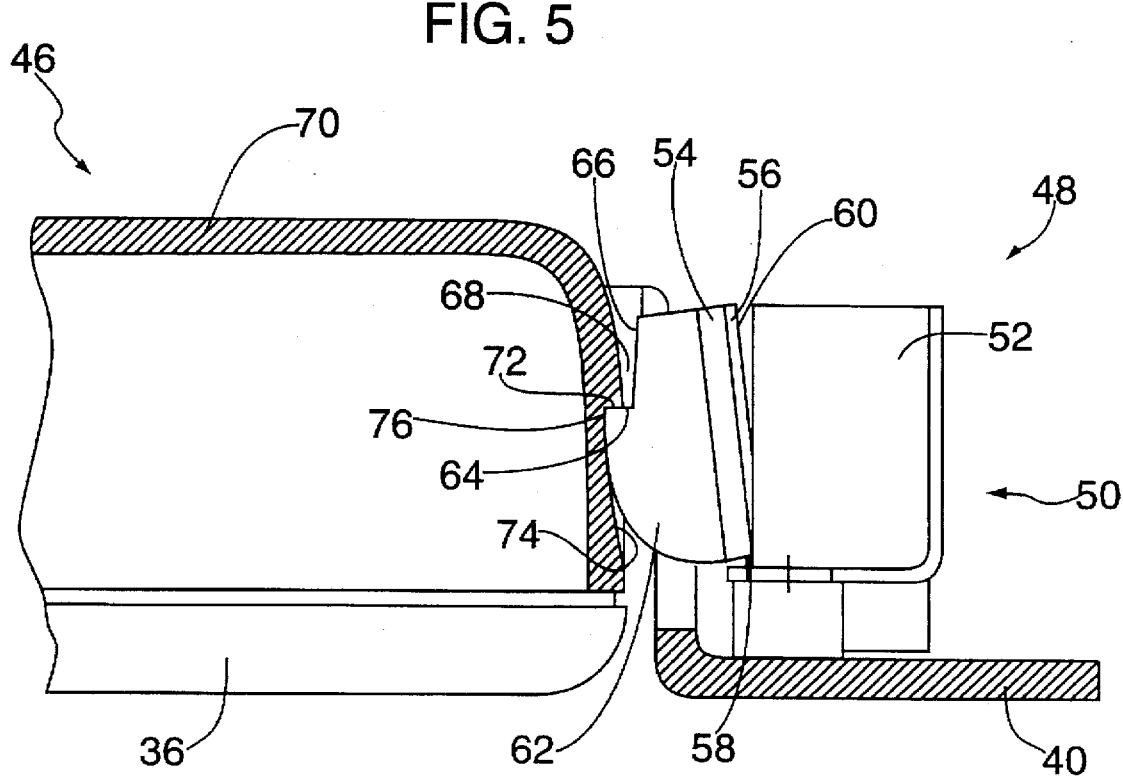
FIG. 6 shows the viewing element latched in a stowed position by the latch device.

In FIG. 5, the viewing element 36 is shown in the retracted position. In this position, the viewing element 36 is positioned such that the horizontal recess portion 72 is spaced apart and above the horizontal cutout portion 64 when the armature 54 is in the open position. If a failure occurs wherein the drive mechanism is unable to hold the viewing element 36 in the retracted position, the viewing element 36 rotates downward. This causes the horizontal recess portion 72 to rotate downward toward the horizontal cutout portion 64 until contact occurs between the horizontal recess portion 72 and the horizontal cutout portion 64. As a result, downward rotation of the viewing element 36 is stopped, thus latching the viewing element 36 in a stowed position. Referring to FIG. 6, the viewing element 36 is shown in the stowed position. Placement of the viewing element 36 in the stowed position places a load on the plunger element 62 and thus the solenoid 50. In a preferred embodiment, the solenoid 50 is selected so that the armature 54 will not move to the closed position when subjected to the load from the viewing element 36 despite energizing of the solenoid 50. This ensures that the armature 54 remains in the open position and that the viewing element 36 remains latched in the stowed position.

Figure 7:
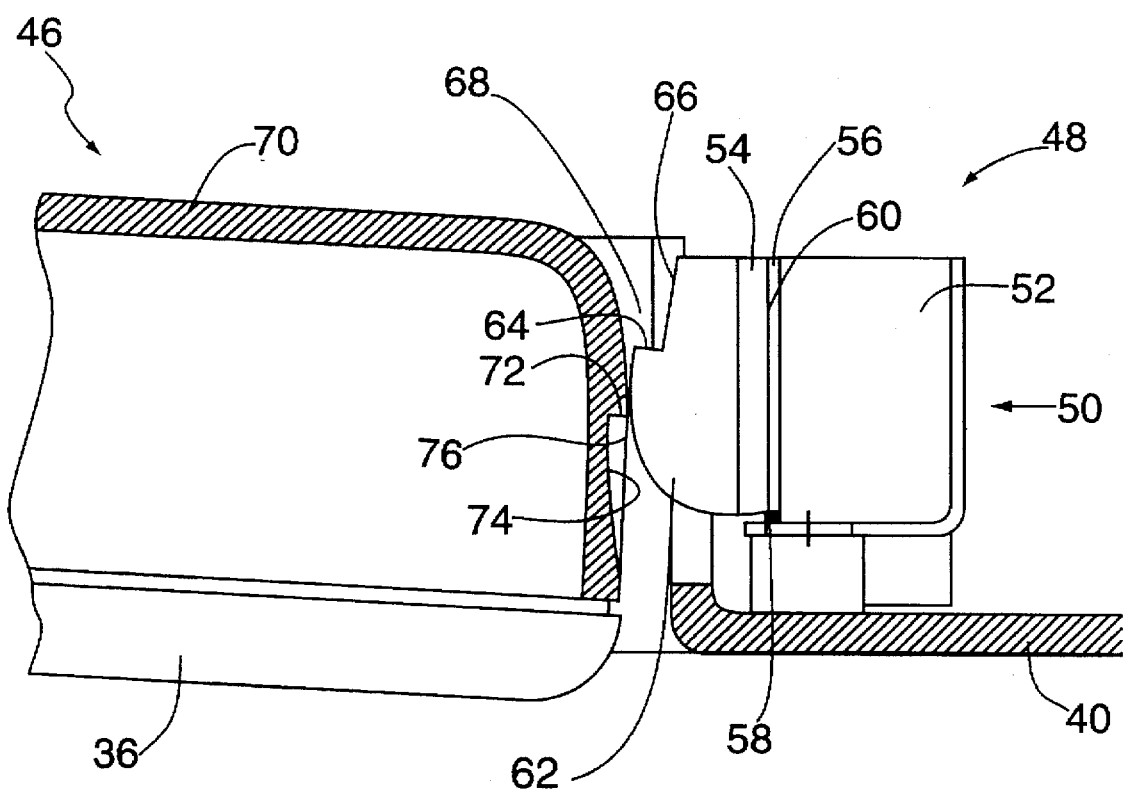
FIG. 7 shows the latch device in a closed (energized) position.

Referring to FIG. 7, the armature 54 is shown in the closed position. In the closed position, the armature 54 is oriented vertically such that the armature face 56 abuts the housing 52. This provides clearance for the viewing element 36 and enables the viewing element 36 to rotate downward toward the viewing position. Energizing of the solenoid 50 causes the armature 54 to rotate to the closed position. Conversely, de-energizing of the solenoid 50 causes the armature 54 to rotate to the open position. Solenoids of this configuration are generally commercially available, such as those manufactured by CLIFTRONICS, INC. and known as hinged clapper solenoids. A thin sheet 60 of noise reducing material, such as rubber, may be affixed to the armature face 56. The sheet 60 serves to reduce the amount of noise generated upon rotation of the armature 54 to the closed position. Alternatively, it is noted that the sheet 60 may be affixed to the housing 52.

In use, the armature 54 is normally in the open position and the drive element 36 is held in the retracted position by the drive mechanism. Therefore, if the drive mechanism fails to hold the viewing element 36, the viewing element 36 rotates downward and is latched by the device 48. Upon activation of the drive mechanism to rotate the viewing element 36 to the viewing position, the armature 54 is rotated to the closed position. This provides clearance between the viewing element 36 and the device 48 and enables rotation of the viewing element 36 to the viewing position.

Thus, it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A fail safe latch device for securing a viewing element in a horizontal position, wherein said viewing element is rotatable between said horizontal position and a downward position and wherein said viewing element, when not in use, is held in a retracted position by a drive mechanism to stop undesirable downward rotation of said viewing element to said downward position, comprising:

a hinged element having a cutout portion, said cutout portion having a first mating surface;

rotating means for rotating said hinged element between a closed position wherein said hinged element is in a vertical orientation and an open position wherein said hinged element is rotated away from said vertical orientation, wherein said hinged element is adapted to rotate to said open position in response to a failure of said drive mechanism; and a notch for being formed in said viewing element, said notch having a second mating surface wherein when said hinged element is in said open position and said viewing element is in said horizontal position, said second mating surface rests upon said first mating surface thereby latching said viewing element in said horizontal position and stopping undesirable downward rotation of said viewing element to said downward position when said drive mechanism fails and said hinged element is in said open position.

2. The latch device according to claim 1, wherein said first and second mating surfaces are oriented horizontally.

3. The latch device according to claim 1, wherein said cutout portion has a reverse L-shaped configuration.

4. The latch according to claim 1, wherein said viewing element includes a bezel and said notch is for being formed in said bezel.

5. The latch device according to claim 1, further including a noise reducing material affixed to said hinged element for reducing noise generated when said hinged element rotates to said closed position.

6. The latch device according to claim 1, wherein said rotating means includes a solenoid.

7. The latch device according to claim 1, wherein said viewing element is a television monitor.

8. A fail safe latch device for securing a viewing element in a stowed position, wherein said viewing element is rotatable between said stowed position and a downward position, and wherein said viewing element, when not in use, is held in a rejected position by a drive mechanism to stop undesirable downward rotation of said viewing element to said downward position comprising:

a hinged element having a cutout portion, said cutout portion having a first mating surface;

rotating means for rotating said hinged element between a closed position wherein said hinged element is in a vertical orientation and an open position wherein said hinged element is rotated away from said vertical orientation, wherein said hinged element is adapted to rotate to said open position in response to a failure of said drive mechanism; and a bezel for said viewing element, said bezel including a notch having a second mating surface wherein when said hinged element is in said open position and said viewing element is in said stowed position, said second mating surface rests upon said first mating surface thereby latching said viewing element in said stowed position and stopping undesirable downward rotation of said viewing element to said downward position when said drive mechanism fails and said hinged element is in said open position.

9. The latch device according to claim 8, wherein said first and second mating surfaces are oriented horizontally.

10. The latch device according to claim 8, wherein said cutout portion has a reverse L-shaped configuration.

11. The latch device according to claim 8, further including a noise reducing material affixed to said hinged element for reducing noise generated when said hinged element rotates to said closed position.

12. The latch device according to claim 8, wherein said rotating means includes a solenoid.

13. The latch device according to claim 8, wherein said viewing element is a television monitor.

14. A fail safe latch device for securing a viewing element for an aircraft video system in a stowed position, said viewing element having a first end and a second end, said first end being rotatably mounted to a ceiling of an aircraft cabin to enable rotation of said viewing element between said stowed position and a downward position suitable for viewing, said system including a drive mechanism for holding said viewing element in a retracted position and wherein failure of said drive mechanism causes downward rotation of said viewing element to said downward position, comprising:

a hinged element having a cutout portion, said cutout portion having a first horizontal mating surface rotating means for rotating said hinged element between a closed position wherein said hinged element is in a vertical orientation and an open position wherein said hinged element is rotated away from said vertical orientation, wherein said hinged element is adapted to rotate to said open position in response to a failure of said drive mechanism; and a notch for being formed in said second end, said notch having a second horizontal mating surface wherein upon deactivation of said rotating means due to a failure in said drive mechanism said hinged element is rotated to said open position to move said first horizontal mating surface underneath and spaced apart from said second horizontal mating surface when said viewing element is in said retracted position wherein upon failure of said drive mechanism said second horizontal mating surface rotates downward and contacts said first horizontal mating surface thereby latching said viewing element in said stowed position and stopping undesirable downward rotation of said viewing element to said downward position when said drive mechanism fails.

15. The latch device according to claim 14, wherein said cutout portion has a reverse L-shaped configuration.

16. The latch according to claim 14, wherein said viewing element includes a bezel and said notch is for being formed in said bezel.

17. The latch device according to claim 14, further including a noise reducing material affixed to said hinged element for reducing noise generated when said hinged element rotates to said closed position.

18. The latch device according to claim 14, wherein said rotating means includes a solenoid.

19. The latch device according to claim 14, wherein said viewing element is a television monitor.

20. A fail safe latch device for securing a monitor for an aircraft video system in a stowed position, said monitor having a first end and a second end, said first end being rotatably mounted to a ceiling of an aircraft cabin to enable rotation of said monitor between said stowed position and a downward position suitable for viewing, said monitor including a bezel and said system including a drive mechanism for holding said monitor in a retracted position and wherein failure of said drive mechanism causes downward rotation of said monitor to said downward position, comprising:

a solenoid having a housing and a hinged element which includes a contact surface, said solenoid having rotating means for rotating said hinged element, said housing for being attached to said ceiling and said hinged element being rotatably attached to said housing by a hinge to enable rotation of said hinged element between a closed position wherein said hinged element is in a vertical orientation wherein said contact surface contacts said housing and an open position wherein said hinged element is rotated away from said vertical orientation, wherein said hinged element is adapted to rotate to said open position in response to a failure of said drive mechanism, said hinged element further including a cutout portion having a reverse L-shaped configuration which includes a first horizontal mating surface;

a notch for being formed in said bezel, said notch having a second horizontal mating surface wherein upon deactivation of said rotating means due to a failure in said drive mechanism said hinged element is rotated to said open position to place said second horizontal mating surface above and spaced apart from said first horizontal mating surface when said viewing element is in said retracted position wherein upon failure of said drive mechanism said second horizontal mating surface rotates downward and contacts said first horizontal mating surface thereby latching said monitor in said stowed position; and a rubber element affixed to said contact surface for reducing noise generated by contact between said contact surface and said housing.

21. A fail safe latch device for an aircraft video system, said video system including a viewing element having a first and second end, wherein said first end is rotatably mounted to an aircraft cabin ceiling to enable rotation of said viewing element between a horizontal position and a downward position, and wherein said viewing element, when not in use, is held in a retracted position by a drive mechanism to stop undesirable downward rotation of said viewing element to said downward position comprising:

a hinged element having a cutout portion, said cutout portion having a first mating surface;

rotating means for rotating said hinged element between a closed position wherein said hinged element is in a vertical orientation and an open position wherein said hinged element is rotated away from said vertical orientation, wherein said hinged element is adapted to rotate to said open position in response to a failure of said drive mechanism; and a notch for being formed in said second end, said notch having a second mating surface wherein when said hinged element is in said open position and said viewing element is in said horizontal position, said second mating surface rests upon said first mating surface thereby latching said viewing element in said horizontal position when said drive mechanism fails.

22. The latch device according to claim 21, wherein said first and second mating surfaces are oriented horizontally.

23. The latch device according to claim 21, wherein said cutout portion has a reverse L-shaped configuration.

24. The latch device according to claim 21, further including a noise reducing material affixed to said hinged element for reducing noise generated when said hinged element rotates to said closed position.

25. The latch device according to claim 21, wherein said rotating means includes a solenoid.

* * * * *